April 5, 1938. J. R. JOHNSON 2,113,554
MACHINE TOOL
Filed Oct. 21, 1936 4 Sheets-Sheet 3
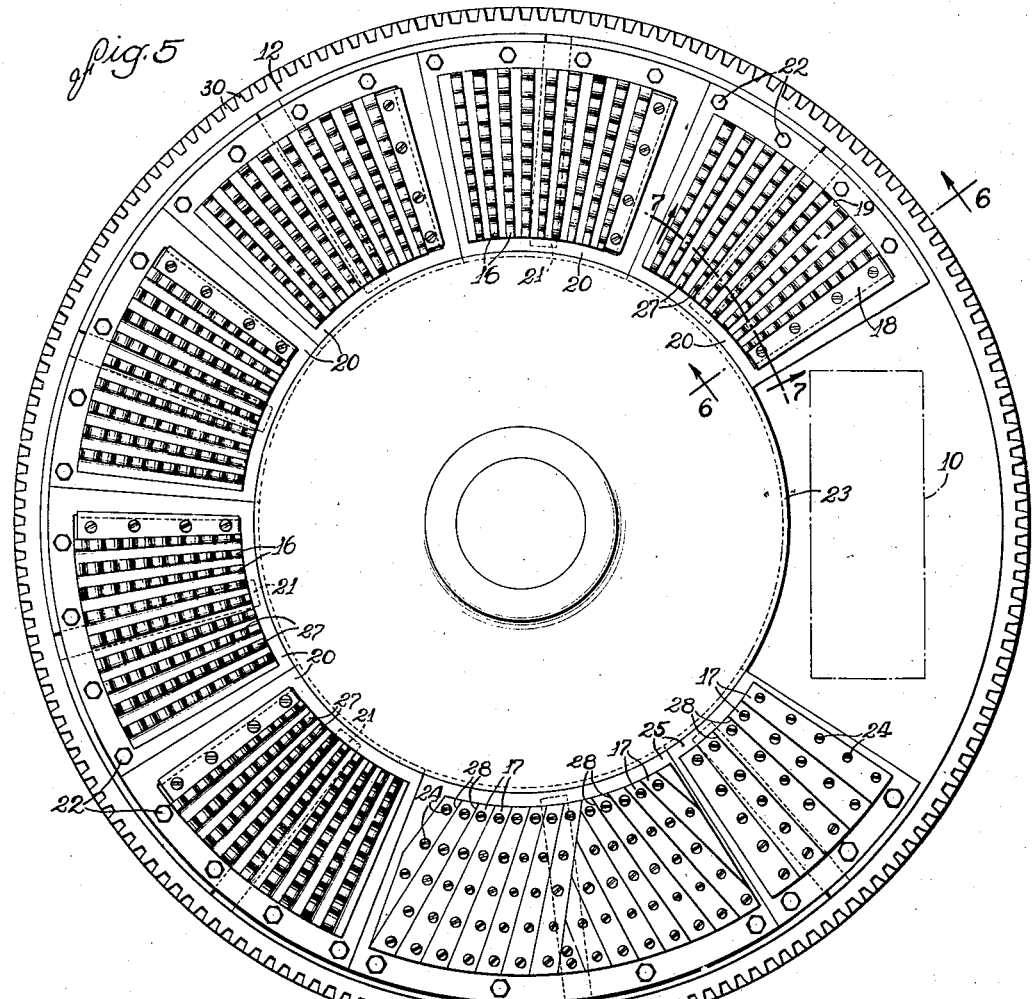
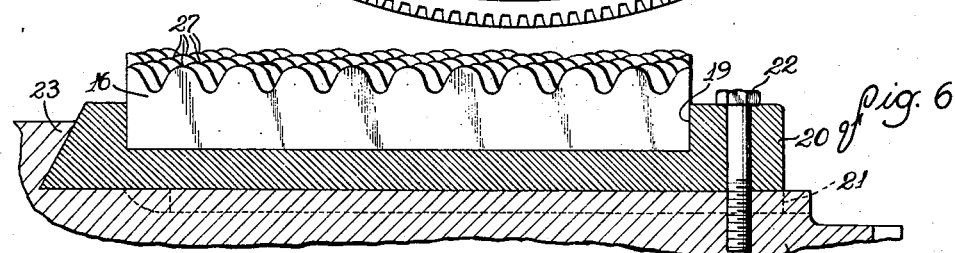
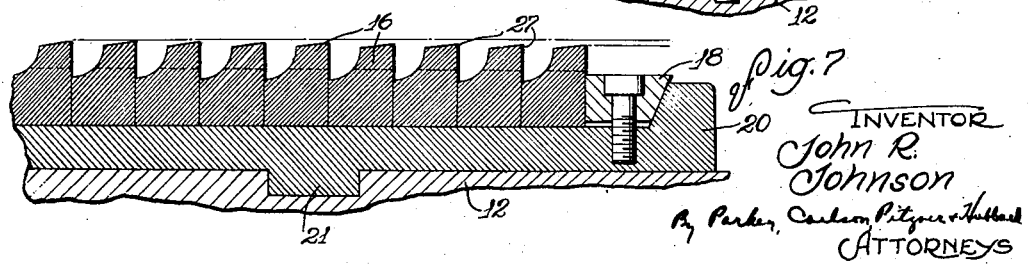
INVENTOR
John R. Johnson
By Parker, Carlson, Pitzner & Hubbard
ATTORNEYS April 5, 1938. J. R. JOHNSON 2,113,554
MACHINE TOOL
Filed Oct. 21, 1936 4 Sheets-Sheet 4
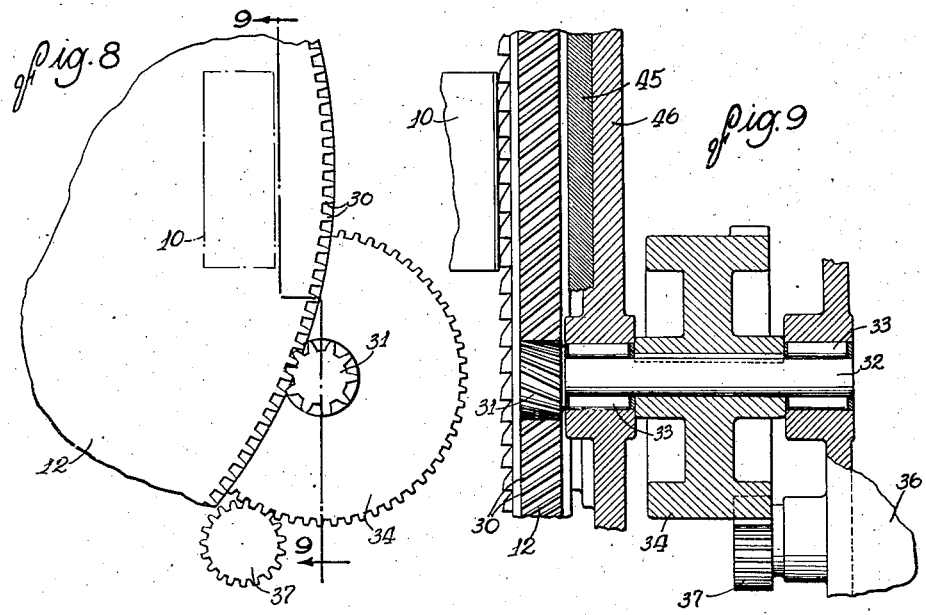
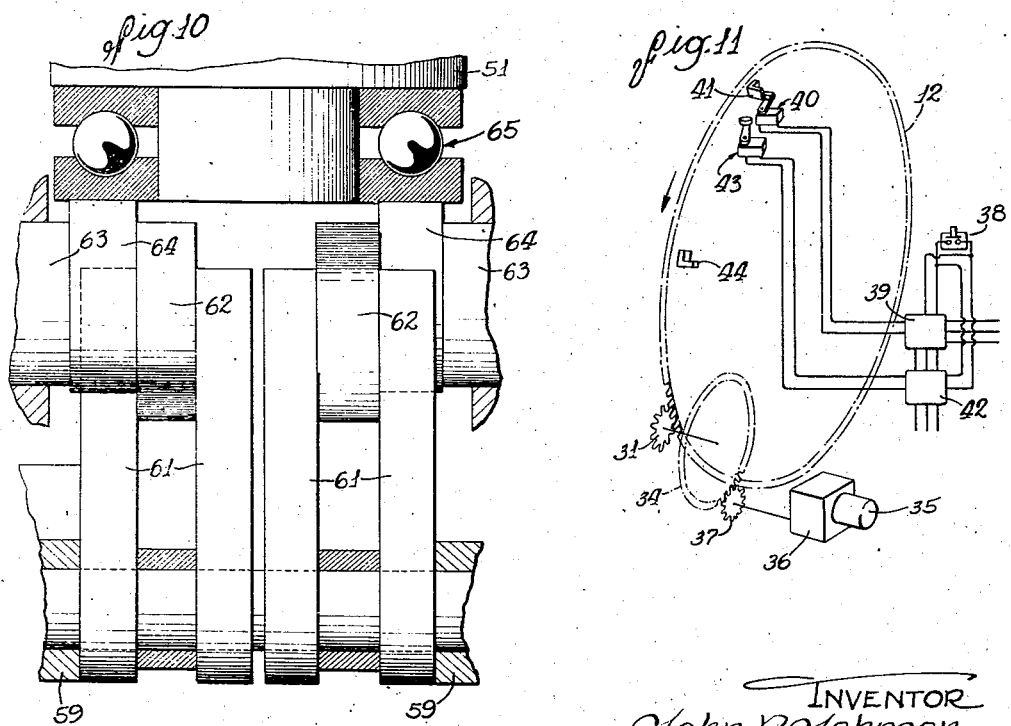
INVENTOR
John R. Johnson
By Parker, Carlson, Pitzner & Hubbard
ATTORNEYS Patented Apr. 5, 1938

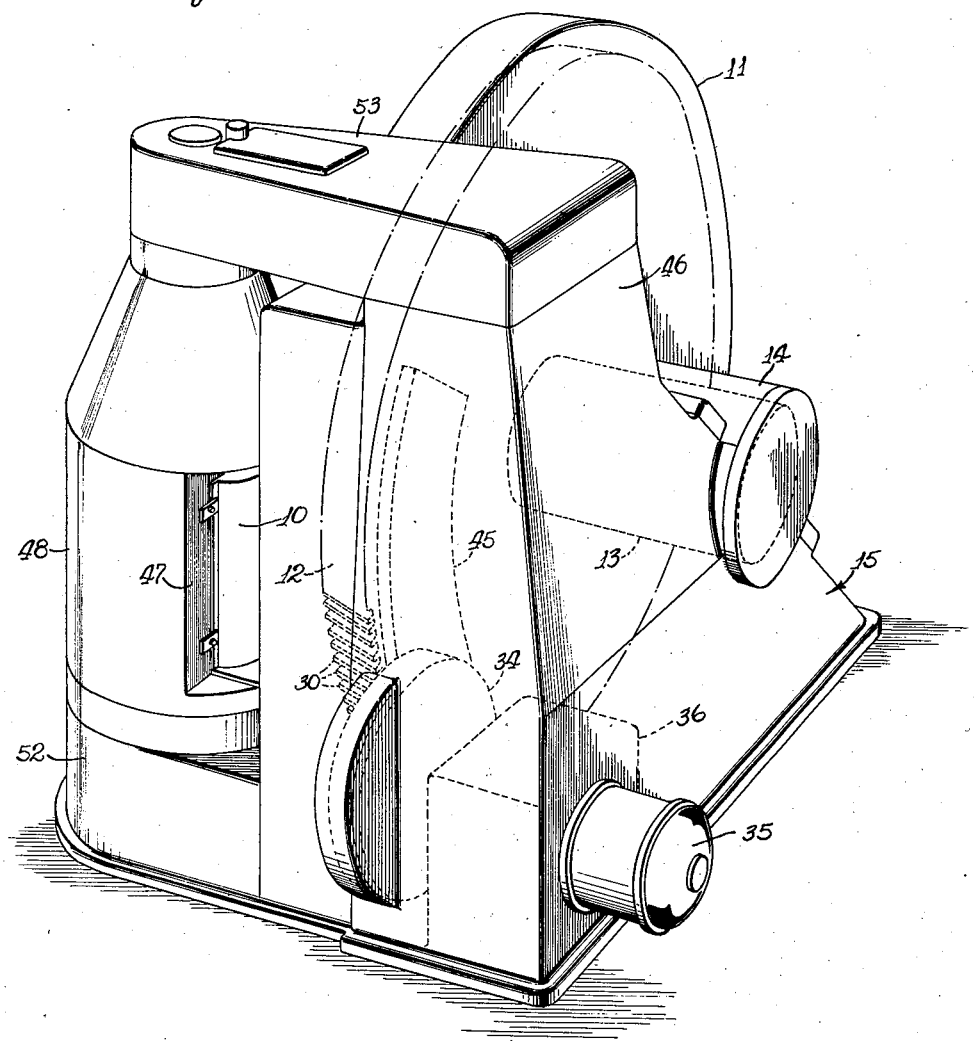

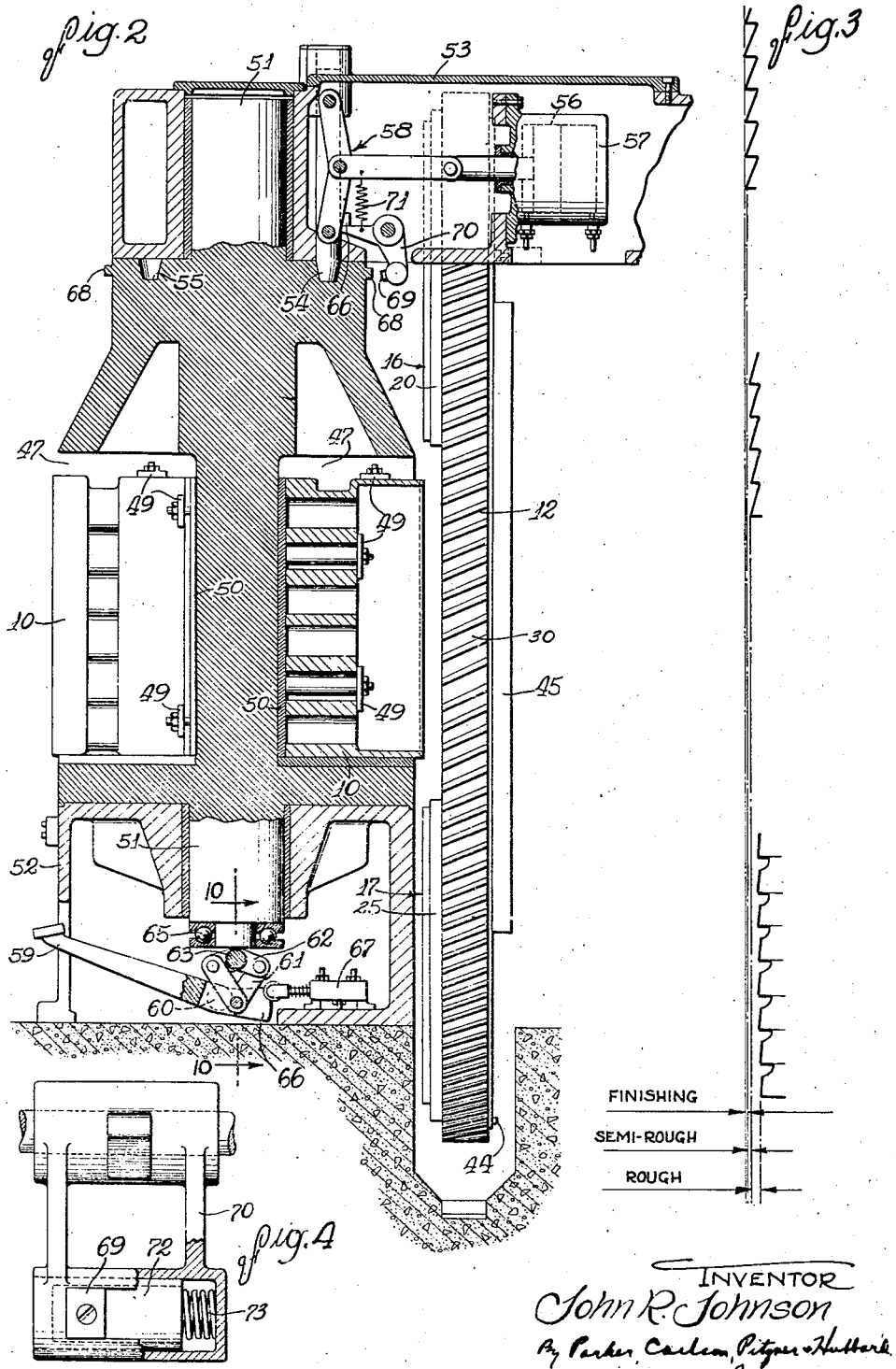

2,113,554

UNITED STATES PATENT OFFICE 2,113,554

MACHINE TOOL

John R. Johnson, Rockford, Ill., assignor to The Ingersoll Milling Machine Company, Rockford, Ill., a corporation of Illinois Application October 21, 1936, Serial No. 106,792

17 Claims. (Cl. 90—33)

This invention relates generally to machine tools and more particularly to those of the type in which the roughing and finishing cutting elements are mounted on a common support and operate successively on the work piece.

One object of the invention is to provide a machine tool of the above character which is simple and inexpensive in construction and operation, and which is capable of machining surfaces of large areas at high speed and with a high degree of accuracy.

Another object is to provide a machine tool in which the roughing, semi-finishing and finishing tools extend substantially around the periphery of a large rotary ruggedly mounted support and arranged to be driven relative to the work in a novel and efficient manner.

The invention also resides in the novel manner in which power is transmitted to the rotary tool carrier, in the novel construction and arrangement of the roughing and finishing blades, and in the novel means for presenting successive work pieces to and supporting the same in working position.

Other objects and advantages of the invention will become apparent from the following detailed description taken in connection with the accompanying drawings, in which Figure 1 is a perspective view of a machine tool embodying the features of the present invention.

Fig. 2 is a vertical sectional view taken through the work support of the machine.

Fig. 3 is a diagrammatic view showing the relation of different cutting-elements.

Fig. 4 is a fragmentary view showing one of the parts of the work-locating mechanism.

Fig. 5 is a face view of the cutter wheel.

Figs. 6 and 7 are sectional views taken respectively along the lines 6—6 and 7—7 of Fig. 5.

Fig. 8 is a fragmentary view of the tool carrier and its driving means.

Fig. 9 is a section taken along the line 9—9 of Fig. 8.

Fig. 10 is a section taken along the line 10—10 of Fig. 2.

Fig. 11 is a schematic view and wiring diagram.

In the exemplary form shown in the drawings, the invention is embodied in a machine tool especially adapted to rough, semi-finish and finish the entire upper or lower surface of an engine block 10 in one revolution of a rotary tool carrier while the block is supported on one of its ends alongside of the carrier. Herein, the carrier comprises a wheel 12 of heavy rigid construction having an elongated trunnion 13 supported in a bearing 14 on a massive base structure 15. The wheel is disposed within a housing 11.

The wheel 12 is of large diameter and carries on one side thereof a circumferential row of substantially radially disposed cutter blades 16 and 17 having edges preferably projecting progressively increasing distances in an axial direction from the wheel so as to remove metal from the work piece in a multiplicity of small increments. The necessary roughing, semi-finishing and finishing cuts are thus made as the wheel turns through an angle sufficient to present all of the blades to the work. In the present instance, the roughing blades which are indicated at 16 are clamped by a wedge 18 in an arcuate groove 19 of a segmental plate 20 which is connected to the wheel proper by a tongue 21 and is clamped against the face of the wheel by a screw 22 and a flange 23 overlying the segment. Herein the finishing blades 17 are individually secured by screws 24 to segments 25 which are also keyed to the wheel and clamped against the face thereof in the same way as the segments supporting the roughing blades.

The terminal groups of roughing and finishing blades are spaced apart circumferentially of the wheel a distance substantially greater than the length of the surface to be machined so as to permit bodily movement of the work piece in a generally radial direction along the face of the wheel into and out of operative position indicated in phantom in Fig. 5. This movement of the work piece takes place while the wheel is at rest after completion of a cycle.

For the purpose of enabling the cutter to operate efficiently upon the hard surfaces of castings, the cutting edges of the roughing blades 16 are interrupted at spaced points along their lengths to form spaced teeth 27, and the teeth of the successive blades in each group are staggered as shown in Figs. 5 and 6 so that each group of roughing blades will remove the metal to a substantially uniform depth over the entire surface of the work piece. By this arrangement, the chips are broken effectually and wear and tear on the cutting elements is reduced materially.

Preferably, the edges 28 of the semi-finishing and finishing blades 17 are arranged in groups disposed at substantially different angles relative to each other. The cutting edges of different groups thus move across the work piece at different angles thereby preventing objectionable vibration of the parts. An extremely smooth and accurately located surface is thus formed on the work piece.

In order to machine surfaces of relatively large area as contemplated by the present invention, considerable power is required to turn the tool carrier 12. To transmit this power to the cutter smoothly and without the attendant danger of shocks which would produce inaccuracies in the machined surface, the invention contemplates applying the power to the periphery of the wheel closely adjacent the work piece and by means of a member capable of storing a substantial amount of energy. To this end, the wheel 12 is formed with peripheral gear teeth 30 which mesh with the teeth of a driving pinion 31 located as shown in Fig. 8 immediately below the work piece 10 so that the force for advancing the cutter pulls the blades across the work surface.

The pinion 312 is fast on one end of a shaft 32 which is supported at widely spaced points in bearings 33 on the machine frame and carries intermediate these bearings a heavy fly-wheel 34. The shaft is driven by an electric motor 35 operating through the medium of suitable speed reduction gears in a box 36 and a pinion 37 meshing with gear teeth on the fly-wheel. The effective mass of the fly-wheel 34 is such as to maintain a uniform movement of the cutting blades across the work in spite of variations in the resistance offered by the work and fluctuations in the power supplied by the motor.

In the present instance, the driving motor 35 is arranged to be started by manual closure of a switch 38 which energizes the motor starting relay 39 which has a maintaining circuit which includes a spring-closed switch 40 positioned to be opened so as to deenergize the relay and stop the motor when its movable contact is engaged by a dog 41 on the cutter wheel. This dog is positioned to cause the motor to be stopped with the vacant sector of the cutter opposite the engine block then in working position.

In a machining operation of the present character, it has been found that a smoother and finer finish can be obtained by moving the cutting elements past the work at a relatively slow speed. Provision is therefore made for reducing the speed of the motor drive during the latter part of the cycle when the finishing teeth of the cutter are in engagement with the work. To this end, the motor driving means is arranged to be controlled by an auxiliary relay 42 associated with the main control circuit in a manner such that the wheel 12 will be rotated at a relatively slower speed when this relay is deenergized by opening of a normally closed switch 43 in the relay circuit. Opening of this switch is effected by a dog 44 positioned on the cutter wheel to open the switch 43 at the desired point.

To hold the cutter blades firmly in operative engagement with the work, the portion of the gear wheel 12 adjacent the work is backed up by a rigid abutment which, in the present instance, comprises a plate 45 of suitable bearing metal secured to a rigid post 46 integral with and upstanding from the machine bed. The side of the wheel 12 opposite the blades 16 and 17 is accurately machined and positioned for rubbing contact with the surface of the plate 45 which is maintained properly lubricated in any suitable manner. By locating the abutment and accurately forming the machined surface of the gear wheel, it will be apparent that the latter will be firmly held against any lateral wobbling and that the work piece surface will be shaved accurately to a dimension determined by the position in which it is held.

An equally strong and rugged mounting is provided for supporting the work while at the same time permitting the pieces to be advanced readily into and out of working position. For this purpose, the block 10 during machining is disposed in a recess 47 in a drum 48 with the end to be machined projecting from the drum a short distance. By means of suitable clamps 49, the block is held against accurately located plates 50 which determine the depth of the cut taken. Two recesses 47 are formed in the drum so that a block may be loaded in one while a block in the other is being machined. The plates 50 in the two recesses may be differently located in the drum so that a block will be positioned in one recess while its first side is being machined and in the other recess during machining of the opposite side.

The drum 48 is mounted to turn about a vertical axis, and for this purpose, trunnions 51 at opposite ends of the drum are journaled in bearings formed in a pedestal 52 and an over-arm 53 both of which are rigidly joined to the frame proper on which the gear wheel is mounted. While the cutter is in engagement with a work piece, the drum 48 is pressed downwardly against the accurately located upper surface of the pedestal by a suitable clamp so that the block is firmly supported. In the form shown, the clamp comprises a tapered plug 54 formed on the lower end of a vertically slidable rod and adapted to be projected into a hole 55 in the drum after the latter has been turned on its axis to move a new work piece into position to be machined. Thus the plug also serves to accurately position the block angularly relative to the cutter. The plug is arranged to be actuated by a pneumatically operated piston 56 disposed within a cylinder 57 and acting on a toggle mechanism 58, one link of which is connected to the plug 54.

To permit the drum to be rotated readily, means is provided for raising the same above the upper surface of the pedestal 52. Herein this means comprises a foot pedal 59 pivoted at 60 and acting when depressed to straighten a pair of toggle links 61 and thereby oscillate a pair of levers 62 and turn a shaft 63 having cams 64 (Fig. 10) thereon. In turning, these cams act through the medium of anti-friction elements 65 to raise the drum slightly after which the drum may be turned freely on the bearings 51. The foot lever 59 has a cam 66 thereon which serves to actuate a valve 67 controlling the flow of pressure fluid to opposite ends of the cylinder 57.

To facilitate location of the drum with one of the holes 55 substantially in alinement with the plug 54, two lugs 68 are provided on the drum corresponding to the positions of the holes 55 and positioned for engagement with a stop 69 carried by a pivoted arm 70 and urged by a spring 71 into the path of the lugs 68. The stop 69 is rigid with a plunger 72 (Fig. 4) urged by a spring 73 in a direction opposite to that in which the drum is moved, but movable against the spring action into a limit position for alining the holes 55 with the plug 54.

In operation, the pedal 51 is depressed after the gear wheel has come to rest whereupon the drum 48 is raised and fluid is admitted to the cylinder 57 so as to move the piston 56 to the right as viewed in Fig. 2 and thereby raise the plug 54 out of the tapered hole. The drum is now free to turn about its axis to bring another block into place. As an incident to withdrawal of the plug 54, a lug 66 thereon allows the arm 70 to swing in a direction to move the stop 69 toward the drum, the stop riding over the lug 68 and in behind the latter as the drum is turned. After the drum has moved through a half-revolution, the other lug 68 encounters the stop 69 which is moved with the drum against the action of the spring 75 but finally arrests the movement of the drum with the other hole 55 positioned to receive the plug 54. The operator then releases the pedal 51 allowing the drum to become seated on the pedestal 52 and reversing the position of the valve 67 which causes the plug to be projected downwardly finally locating the new work piece in position to be machined. Entry of the plug 54 also withdraws the stop 69 from engagement with the lug 68 whereupon the spring 73 moves the stop backwardly into a position free of the lug.

Next, the motor 35 is started by closure of the switch 38. The movement of the cutter wheel 12 is gradually accelerated as the roughing blades engage the work. The cutter continues at full speed until most of the teeth 27 have operated upon the work whereupon the dog 44 engages and opens the switch 43 as the finishing blades approach the work. The speed of the motor drive is thus reduced and the remainder of the machining is completed with the cutters moving slowly so as to produce a smooth accurate finish. The energy stored in the fly-wheel 34 causes the speed to be changed gradually and without shock to the cutter. The cycle is terminated after all of the cutter blades have passed out of engagement with the work and the vacant sector on the gear wheel has been brought opposite the work. The completed work piece is then removed in the manner above described.

From the foregoing, it will be observed that both the cutters and the work are firmly supported by massive and rigid structures during the machining operation and that the power is supplied in a manner such as to minimize shock and vibration. As a result, the work can be machined rapidly and with a high degree of accuracy.

This application is a continuation in part of my application Serial No. 713,675, filed March 2, 1934.

I claim as my invention:

1. A machine tool having, in combination, a rotary wheel carrying a circumferential row of cutter blades interrupted over a small sector of the wheel, means rotatably supporting said wheel to turn about a horizontal axis, a pedestal positioned adjacent the cutter side of said wheel and having a substantially flat upper surface, a work carrier mounted on said pedestal to turn about a vertical axis and having an under surface adapted to rest upon said pedestal surface, a fixture on said work carrier for supporting a work piece for movement into and out of the vacant sector of said tool carrier with the surface to be machined positioned for operative engagement by said blades, means by which said work carrier may be clamped down against said pedestal during machining of a work piece, and means for raising said work carrier free of said pedestal surface to permit free rotation of the work carrier for moving a new work piece into working position.

2. A machine tool having, in combination, a rotary wheel carrying a circumferential row of cutter blades interrupted over a small sector of the wheel, means rotatably supporting said wheel to turn about a horizontal axis, a pedestal positioned adjacent the cutter side of said wheel and having an upper supporting surface, a work carrier mounted on said pedestal to turn about a vertical axis and having an under surface adapted to rest upon said pedestal surface, a fixture on said work carrier for supporting a work piece for movement into and out of the vacant sector of said tool carrier with the surface to be machined positioned for operative engagement by said blades, and means by which said work carrier may be clamped down against said pedestal during machining of a work piece.

3. A machine tool having, in combination, a rotary cutter wheel carrying a circumferential row of cutter blades interrupted over a small sector of the wheel, means rotatably supporting said wheel to turn about a horizontal axis, a work carrier adapted to support work pieces to be machined and mounted adjacent the cutter side of said wheel to turn about a vertical axis whereby a work piece may be moved into and out of said vacant sector in a direction generally radially of said wheel, a work support on said work carrier positioned to locate a work piece properly relative to said blades when the work carrier is in a predetermined angular position, and a tapered pin and a recess cooperating therewith when said work carrier is adjacent said predetermined position to locate the carrier accurately in said position.

4. A machine tool having, in combination, a rotary tool carrier having a circumferential row of radially disposed cutter blades mounted on one side thereof and projecting axially therefrom, the lengths of said blades measured radially of said wheel being greater than the width of the surface to be machined, said blades being interrupted over a small sector of the wheel, means rotatably supporting said wheel to turn about a horizontal axis, and a rigid drum mounted adjacent the cutter side of said wheel to turn about a vertical axis and having portions for supporting a plurality of work pieces with the surfaces to be machined disposed parallel to the drum axis.

5. A machine tool having, in combination, a rotary tool carrier having a circumferential row of radially disposed cutter blades mounted on one side thereof and projecting axially therefrom, the lengths of said blades measured radially of said wheel being greater than the width of the surface to be machined, said blades being interrupted over a small sector of the wheel, means rotatably supporting said wheel to turn about a horizontal axis, a work carrier adapted to support work pieces to be machined and mounted adjacent the cutter side of said wheel to turn about a vertical axis whereby a work piece may be moved into and out of said vacant sector in a direction generally radially of said wheel, and a work support on said work carrier positioned to locate a work piece properly relative to said blades when the work carrier is in a predetermined angular position.

6. A machine tool having, in combination, a rotatable tool carrier having a circumferential row of blades on one side thereof projecting progressively increasing distances in an axial direction for taking roughing and finishing cuts across the face of the work surface to be machined, means to support a work piece in position for engagement by the successive blades in the rotation of said carrier, electric motor driving means for rotating said carrier, and means controlling said driving means to cause said carrier to be advanced at one speed during engagement of most of said blades with the work and at a relatively slower speed during engagement of the remaining blades.

7. A machine tool having, in combination, a rotatable tool carrier having a circumferential row of blades on one side thereof projecting progressively increasing distances in an axial direction for taking roughing and finishing cuts across the face of the work surface to be machined, means to support a work piece in position for engagement by the successive blades in the rotation of said carrier, and power driven means operating to advance said carrier at one speed during engagement of the roughing blades with the work piece and at a relatively slower speed during engagement of the finishing blades.

8. A machine tool having, in combination, a wheel of large diameter having a circumferential row of radially disposed cutter blades mounted on one side thereof and projecting therefrom different distances in an axial direction for producing roughing and finishing cuts, said blades being interrupted over a short sector of the wheel and having a radial length greater than the width of the work surface to be machined, means for supporting a work piece for engagement with said blades, gear teeth around the entire periphery of said wheel, a pinion meshing with said gear teeth, means for driving said pinion including an electric motor and a shaft driven thereby, and a flywheel on said shaft operable to compensate for variation in the resistance offered by the work to machining by said blades.

9. A machine tool having, in combination, a wheel of large diameter having a circumferential row of radially disposed cutter blades mounted on one side thereof and projecting therefrom different distances in an axial direction for producing roughing and finishing cuts, said blades being interrupted over a short sector of the wheel and having a radial length greater than the width of the work surface to be machined, means for supporting a work piece for engagement with said blades, gear teeth around the entire periphery of said wheel, and a power driven gear meshing with said gear teeth at a point adjacent but beyond the area of engagement of said blades with the work piece.

10. A machine tool having, in combination, a wheel of large diameter having a circumferential row of radially disposed cutter blades mounted on one side thereof and projecting therefrom different distances in an axial direction for producing roughing and finishing cuts, said blades being interrupted over a sector of the wheel and having a radial length greater than the width of the work surface to be machined, means for supporting a work piece for engagement with said blades, gear teeth around the entire periphery of said wheel, and a power driven pinion meshing with said gear teeth at a point adjacent the area of engagement of said blades with the work piece.

11. A machine tool having, in combination, a wheel of large diameter having a circumferential row of cutter blades extending in a generally radial direction along one side thereof and projecting therefrom progressively increasing distances in an axial direction for producing roughing and finishing cuts, said blades being interrupted over a vacant sector of the wheel and having a radial length greater than the length of the work surface to be machined, a shaft rotatably supporting said wheel from its center, means for supporting a work piece for engagement with the successive blades in the rotation of said wheel, gear teeth around the entire periphery of said wheel, and a power driven pinion meshing with said gear teeth for applying driving power to the wheel at the periphery thereof.

12. A machine tool having, in combination, a rotary tool carrier having a circumferential row of radially disposed cutter blades mounted on one side thereof and projecting axially therefrom, said blades being interrupted over a small sector of the wheel, means rotatably supporting said wheel to turn about a horizontal axis, a work carrier adapted to support work pieces to be machined and mounted adjacent the cutter side of said wheel to turn about a vertical axis whereby a work piece may be moved into and out of said vacant sector in a direction generally radially of said wheel, and a work support on said work carrier positioned to locate a work piece properly relative to said blades when the work carrier is in a predetermined angular position.

13. A machine tool having, in combination, a wheel of large diameter having a circumferential row of radially disposed cutter blades mounted on one side thereof and projecting therefrom in an axial direction for producing roughing and finishing cuts, said blades being interrupted over a short section of the wheel, means for supporting a work piece for engagement with said blades, gear teeth around the entire periphery of said wheel, and a power driven gear meshing with said gear teeth at a point adjacent but beyond the area of engagement of said blades with the work piece.

14. A machine tool having, in combination, a wheel of large diameter having a circumferential row of cutter blades extending in a generally radial direction along one side thereof for producing roughing and finishing cuts, said blades being interrupted over a vacant sector of the wheel, a shaft rotatably supporting said wheel from its center, means for supporting a work piece for engagement with the successive blades in the rotation of said wheel, gear teeth around the entire periphery of said wheel, and a power driven pinion meshing with said gear teeth for applying driving power to the wheel at the periphery thereof.

15. A machine tool having, in combination, a cutter wheel having a circumferential row of blades of a radial length greater than the width of the surface to be machined and projecting from the wheel progressively increasing distances in an axial direction so as to take roughing and finishing cuts, the roughing and finishing blades being spaced apart circumferentially to receive the work piece between them and the edges of said roughing blades being interrupted at radially spaced points along their lengths with the interruptions of successive edges arranged in staggered relation, and power driven means for rotating said wheel.

16. A machine tool having, in combination, a cutter wheel having a circumferential row of blades of a radial length greater than the width of the surface to be machined and projecting from the wheel progressively increasing distances in an axial direction so as to take roughing and finishing cuts, the roughing and finishing blades being spaced apart circumferentially to receive the work piece between them, power driven means for rotating said wheel to move all of the blades thereon across the work surface, the edges of said roughing blades being interrupted at spaced points along their lengths and the active edges of said finishing blades being continuous.

17. A machine tool having, in combination, a cutter wheel having a circumferential row of blades of a radial length greater than the width of the surface to be machined and projecting from the wheel progressively increasing distances in an axial direction so as to take roughing and finishing cuts, the roughing and finishing blades being spaced apart circumferentially to receive the work piece between them and the edges of said finishing blades being arranged in groups with the edges of each group disposed at different angles relative to radii of said wheel through the respective edges, and power driven means for rotating said wheel.

JOHN R. JOHNSON.